(12) United States Patent
Kotler

(10) Patent No.: US 11,782,757 B2
(45) Date of Patent: Oct. 10, 2023

(54) SCHEDULING OFF-CHIP MEMORY ACCESS FOR PROGRAMS WITH PREDICTABLE EXECUTION

(71) Applicant: SiMa Technologies, Inc., San Jose, CA (US)

(72) Inventor: Reed Kotler, San Jose, CA (US)

(73) Assignee: SiMa Technologies, Inc., San Jose, CA (US)

( * ) Notice: Subject to any disclaimer, the term of this patent is extended or adjusted under 35 U.S.C. 154(b) by 16 days.

(21) Appl. No.: 17/315,225

(22) Filed: May 7, 2021

(65) Prior Publication Data

US 2022/0357984 A1 Nov. 10, 2022

(51) Int. Cl.

| | |
|---|---|
| *G06F 9/48* | (2006.01) |
| *G06F 9/30* | (2018.01) |
| *G06F 9/54* | (2006.01) |
| *G06N 20/20* | (2019.01) |
| *G06N 3/10* | (2006.01) |
| *G06N 20/00* | (2019.01) |

(52) U.S. Cl.
CPC .......... *G06F 9/4881* (2013.01); *G06F 9/3004* (2013.01); *G06F 9/544* (2013.01); *G06N 3/10* (2013.01); *G06N 20/20* (2019.01); *G06N 20/00* (2019.01)

(58) Field of Classification Search
None
See application file for complete search history.

(56) References Cited

U.S. PATENT DOCUMENTS

| | | | |
|---|---|---|---|
| 9,928,460 B1 | 3/2018 | Nowatzyk et al. | |
| 10,585,716 B2* | 3/2020 | Knowles | G06F 13/1657 |
| 10,685,295 B1* | 6/2020 | Ross | G06N 20/00 |
| 2019/0004878 A1 | 1/2019 | Adler et al. | |
| 2019/0018815 A1 | 1/2019 | Fleming et al. | |
| 2019/0076031 A1 | 3/2019 | Valys et al. | |

(Continued)

OTHER PUBLICATIONS

International Search Report and Written Opinion, Patent Cooperation Treaty Application No. PCT/US2021/063756, dated May 13, 2022, 15 pages.

(Continued)

*Primary Examiner* — Abu Zar Ghaffari
(74) *Attorney, Agent, or Firm* — Fenwick & West LLP

(57) ABSTRACT

A machine learning network is implemented by executing a computer program of instructions on a machine learning accelerator (MLA) comprising a plurality of interconnected storage elements (SEs) and processing elements (PEs). The instructions are partitioned into blocks, which are retrieved from off-chip memory. The block includes a set of deterministic instructions (MLA instructions) to be executed by on-chip storage elements and/or processing elements according to a static schedule from a compiler. The MLA instructions may require data retrieved from off-chip memory by memory access instructions contained in prior blocks. The compiler also schedules the memory access instructions in a manner that avoids contention for access to the off-chip memory. By avoiding contention, the execution time of off-chip memory accesses becomes predictable enough and short enough that the memory access instructions may be scheduled so that they are known to complete before the retrieved data is required.

18 Claims, 12 Drawing Sheets

(56) References Cited

U.S. PATENT DOCUMENTS

| | | | |
|---|---|---|---|
| 2019/0138373 A1* | 5/2019 | Nicol | G06F 9/4881 |
| 2019/0155768 A1 | 5/2019 | Wilkinson et al. | |
| 2019/0205745 A1* | 7/2019 | Sridharan | G06N 3/08 |
| 2019/0213160 A1* | 7/2019 | Asghar | G06F 13/4027 |
| 2019/0286973 A1 | 9/2019 | Kowuri et al. | |
| 2019/0287017 A1* | 9/2019 | Esmaeilzadeh, V .. | G06F 9/5038 |
| 2019/0303346 A1 | 10/2019 | Brewer | |
| 2019/0303518 A1 | 10/2019 | Drego et al. | |
| 2019/0391796 A1 | 12/2019 | Brady et al. | |
| 2020/0007342 A1 | 1/2020 | Liem et al. | |
| 2020/0012536 A1 | 1/2020 | Lacey et al. | |
| 2020/0012537 A1 | 1/2020 | Lacey et al. | |
| 2020/0065073 A1 | 2/2020 | Pan et al. | |
| 2020/0073830 A1 | 3/2020 | Verrilli et al. | |
| 2020/0090383 A1 | 3/2020 | Dwivedi | |
| 2020/0133914 A1 | 4/2020 | Wilkinson et al. | |
| 2020/0150713 A1 | 5/2020 | Knowles et al. | |
| 2020/0341807 A1 | 10/2020 | Xu et al. | |
| 2021/0026686 A1* | 1/2021 | Sakharshete | G06F 9/30036 |
| 2021/0173648 A1* | 6/2021 | Lo | G06F 9/3877 |
| 2021/0181974 A1* | 6/2021 | Ghosh | G06F 3/0611 |
| 2021/0201526 A1 | 7/2021 | Moloney et al. | |
| 2021/0217130 A1* | 7/2021 | Nurvitadhi | G06N 20/00 |
| 2021/0374607 A1* | 12/2021 | Kazakov | G06F 13/4027 |
| 2022/0092408 A1* | 3/2022 | Khaitan | G06N 3/063 |
| 2023/0168925 A1* | 6/2023 | Makaya | G06F 9/4881 |
| | | | 718/102 |

OTHER PUBLICATIONS

Andri et al., "YodaNN: An Architecture for Ultralow Power Binary-Weight CNN Acceleration", IEEE Transactions On Computer-Aided Design of Integrated Circuits and Systems, vol. 37, No. 1, Jan. 2018, pp. 48-60.

Ankit et al., "PUMA: A Programmable Ultra-efficient Memristor-based Accelerator for Machine Learning Inference", ASPLOS'19, Apr. 13-17, 2019, Providence, RI, USA, pp. 715-731.

Du et al., "ShiDianNao: Shifting Vision Processing Closer to the Sensor", ISCA'15, Jun. 13-17, 2015, Portland, OR, USA, pp. 92-104.

Everson et al., "A 104.8TOPS/W One-Shot Time-Based Neuromorphic Chip Employing Dynamic Threshold Error Correction in 65nm", IEEE Asian Solid-State Circuits Conference Nov. 5-7, 2018/Tainan, Taiwan, pp. 273-276.

Guha, A. et al., "Deepframe: A Profile-Driven Compiler for Spatial Hardware Accelerators," 2019 28th International Conference on Parallel Architectures and Compilation Techniques (PACT), Sep. 23-26, 2019, pp. 68-81.

Jiao et al., "A 12nm Programmable Convolution-Efficient Neural-Processing-Unit Chip Achieving 825TOPS", ISSCC 2020, Session 7, Feb. 18, 2020, 5 pages.

Reuther et al., "Survey and Benchmarking of Machine Learning Accelerators", 2019 IEEE High Performance Extreme Computing Conference (HPEC) Sep. 24-26, 2019, pp. 1-9.

Shawahna et al., "FPGA-Based Accelerators of Deep Learning Networks for Learning and Classification: A Review", IEEE Access, vol. 7, 2019, pp. 7823-7858.

* cited by examiner

| BLOCK 1 | | | | |
|---|---|---|---|---|
| Header | | Block size = 5 instructions | | |
| | | Block duration = 5 cycles | | |
| Ref | Dest | Instruction | Cycle | Comment |
| 1 | SE (N, 4) | Load data from DRAM | 1 | DMA for block 2 |
| 2 | SE (S, 5) | Load data from DRAM | 1 | DMA for block 2 |
| 3 | SE (E, 6) | Load data from DRAM | 2 | DMA for block 3 |
| 4 | PE (7, 5) | Setup | 3 | |
| 5 | PE (1, 3) | Setup | 3 | |

| BLOCK 2 | | | | |
|---|---|---|---|---|
| Header | | Block size = 9 instructions | | |
| | | Block duration = 760 cycles | | |
| Ref | Dest | Instruction | Cycle | Comment |
| 1 | SE (W, 7) | Store data in DRAM | 1 | DMA for block 4 |
| 2 | SE (S, 5) | Transfer data to PE (7, 5) | 1 | |
| 3 | SE (N, 4) | Transfer data to PE (1, 3) | 1 | |
| 4 | PE (5, 5) | Setup | 5 | |
| 5 | PE (5, 5) | Setup | 10 | |
| 6 | PE (7, 5) | Compute | 111 | |
| 7 | PE (1, 3) | Compute | 234 | |
| 8 | PE (1, 3) | Transfer data to SE (W, 7) | 462 | |
| 9 | PE (7, 5) | Transfer data to PE (5, 5) | 539 | |

| BLOCK 3 | | | | |
|---|---|---|---|---|
| Header | | Block size = 4 instructions | | |
| | | Block duration = 670 cycles | | |
| Ref | Dest | Instruction | Cycle | Comment |
| 1 | SE (S, 9) | Store data in DRAM | 1 | DMA for block 4 |
| 2 | SE (E, 6) | Transfer data to PE (5, 5) | 1 | |
| 3 | PE (5, 5) | Compute | 210 | |
| 4 | PE (5, 5) | Transfer data to SE (S, 9) | 584 | |

FIG. 1C

SCHEDULING OFF-CHIP MEMORY ACCESS FOR PROGRAMS WITH PREDICTABLE EXECUTION

BACKGROUND

1. Technical Field

This disclosure relates generally to the implementation of predictable computer programs (such as machine learning networks) on hardware, and more particularly to the scheduling of instructions for such programs.

2. Description of Related Art

Machine learning is one of the most powerful recent trends in technology. In machine learning, a model is developed to perform a certain task. The model, which will be referred to as a machine learning network, is trained and deployed in order to carry out that task.

For example, a model may be developed to recognize the presence of objects within images captured by a set of cameras. Once the model is deployed, images captured by the cameras are input to the machine learning network, which then outputs whether objects are present within the images or to what confidence level objects are present within the images.

Due to the computational and memory load, machine learning networks are often implemented in compute facilities with access to significant resources, such as in the cloud or on server clusters. However, the sources of input to machine learning networks may be located remotely from these compute facilities. For example, cameras and other types of sensors may be edge devices. Thus, one common paradigm is for the input sources to be web-based so that they can continuously send their captured data to the cloud-based compute facility, which then executes the machine learning network and returns the result. There can be many advantages if the machine learning network was instead embedded on edge devices, such as combined with the camera system.

Machine learning networks typically require the execution of a large number of computations. As a result, they are good candidates for parallel processing architectures. However, machine learning networks typically also require a large volume of data which is stored in memory, and one challenge common to all parallel processing architectures is memory access. Architectures that utilize even a modest number of processors find their performance quickly bottlenecked by their ability to fetch and store memory values. The underlying problem is that it is not practical to provide every processor with a dedicated port into every memory bank, especially if the machine learning network is implemented on an edge device with limited resources. As a result, some form of network is required between memory and processors to resolve conflicting accesses to the same memory bank. These networks and the corresponding conflict resolution process introduce complexity and can make memory access time slow and unpredictable. If memory access utilizes such a network, a processor cannot predict with certainty (other than using a very large value for the completion time) when a requested fetch or store will complete.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

FIG. 1C is a simplified example using three blocks of instructions.

DETAILED DESCRIPTION OF THE PREFERRED EMBODIMENTS

Figure 1A:
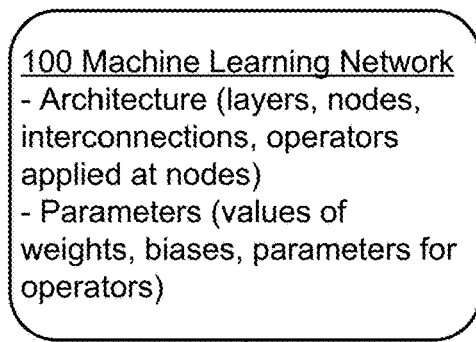
FIG. 1A is a block diagram of a system with a machine learning accelerator (MLA) and corresponding compiler.
Figure 1A:
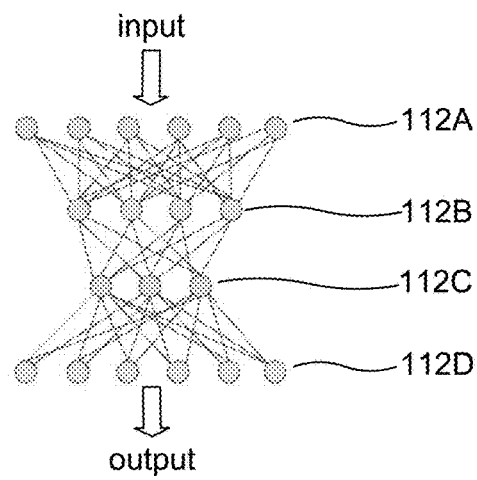
Figure 1A:
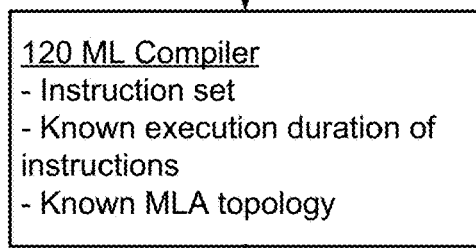
Figure 1A:
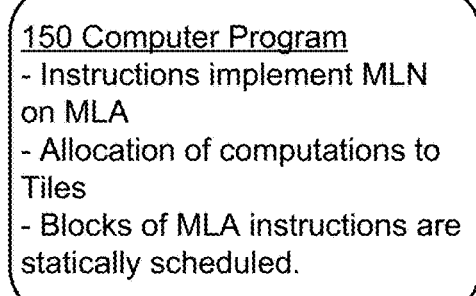
Figure 1A:
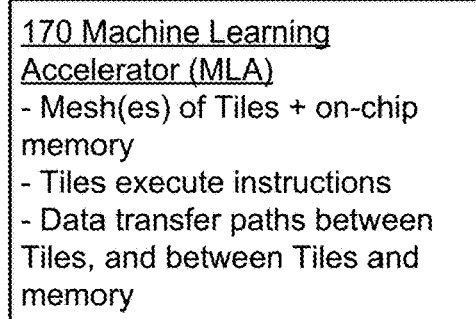
Figure 1A:
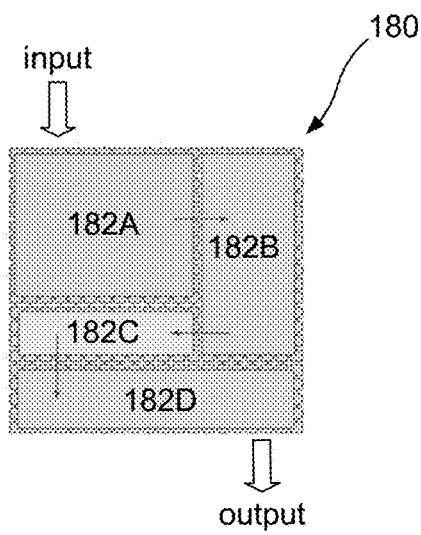

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

A machine learning accelerator (MLA) is described herein that may be built into an edge device. The MLA executes a machine learning network (MLN). As will be described in more detail below, one method of optimizing execution of an MLN is to use a compiler that, prior to run-time, generates a computer program with statically scheduled instructions for executing the MLN. For example, the compiler may determine which instructions are executed by which processing elements in the MLA at what time. Static scheduling enables one or more processing elements in the MLA to execute the instructions with no run-time conditions, branching or dependencies. This may result in lower power consumption, simpler MLA design, and lower cost.

However, because on-chip memory accessible by the processing elements is limited, the statically scheduled instructions and corresponding data may be stored in off-chip memory and then transferred to on-chip storage elements for consumption by the processing elements. On-chip memory such as static random access memory (SRAM) has a known access time, so data transfers from SRAM storage elements to and from processing elements may be statically scheduled. However, SRAM typically has limited space.

Off-chip memory such as DRAM has much more space available. However, if there are even a moderate number of processing elements, it is not feasible for each processing element to have a dedicated port to every memory bank of the DRAM. Typically, the processing elements will share access to the DRAM, resulting in contention for the DRAM access. Additional circuitry may be added to handle this contention, for example through mechanisms such as arbitration or other forms of conflict resolution, and congestion reduction and avoidance. However, this adds complexity and cost to the edge device, and it adds variability and unpredictability to the DRAM access time. As a result, the compiler may not be able to predict when the data fetched from the DRAM are ready for execution and therefore cannot statically schedule data transfers from DRAM. If that is the case, a processor may have to stall the execution of instructions at run-time, while waiting for required data to arrive from DRAM. This issue may be compounded if instructions are to be executed by multiple processing elements according to a common static schedule because the processing elements are synchronized in their operation. One processing element cannot start execution of its statically scheduled instructions later than another processing element, just because its data arrived later.

In one approach, to facilitate execution, the compiler may schedule instructions in a manner that eliminates contention for DRAM access, thus removing the timing variability of DRAM accesses. The more predictable DRAM access may then be scheduled so that data retrieved from DRAM is known to be available by the time it is required by a later instruction. That is, at the time of scheduling by the compiler, the time required for DRAM access is predictable enough and short enough since there is no risk of contention, that DRAM accesses may be scheduled early enough to guarantee their completion by the time the retrieved data is required.

This approach is first described in the context of MLNs implemented by an MLA, but it may also be applied to other situations. After the machine learning application is described, this approach is generalized to "predictable" programs implemented in parallel processing architectures.

In the machine learning example described below, the parallel processing fabric is implemented as an MLA which includes a mesh of processing elements (PEs) and storage elements (SEs) implemented on a semiconductor die, although this is not required. For convenience, the term data handling unit (DHU) will be used to refer to elements in the parallel processing architecture. The PEs and SEs described below are examples of DHUs, although other types of DHUs may also be used. The DHUs share access to off-chip memory (e.g., DRAM).

The computer program implementing the MLN includes instructions executed by the DHUs for implementing the MLN. For convenience, these instructions are referred to as MLA instructions. In the example below, MLA instructions include both (a) compute instructions that execute computations in the machine learning network, and (b) data transfer instructions that transfer data between DHUs. The MLA instructions are deterministic in their duration (i.e., execution time) and, as a result, may be statically scheduled with respect to each other.

The computer program implementing the MLN also includes memory access instructions for retrieving data from off-chip memory for use by the MLA instructions. In many cases, a memory access instruction must complete before the corresponding MLA instruction is executed. One approach is to check whether the required data is available before executing the MLA instruction. If the data is not available, the MLA instruction is stalled and does not execute until the data has been retrieved from off-chip memory and is available. However, this approach can be problematic, particularly if a block of MLA instructions are statically scheduled.

An alternate approach described herein is to schedule the memory access instructions so that there is no contention for access to the off-chip memory. As a result, each memory access instruction can execute when scheduled and will complete execution within a known duration, because the variability introduced by contention resolution has been removed. Given the known duration, the memory access instructions are scheduled early enough that, at time of scheduling by the compiler, it is known that the retrieved data will be available to the DHUs before the retrieved data is used by the corresponding statically scheduled MLA instruction. In effect, by eliminating contention for access to the off-chip memory, the memory access instructions become predictable enough in duration that they may also be statically scheduled.

This is possible due to the nature of an MLN. Machine learning is dominated by computationally intensive matrix multiply instructions which execute in order $O(n^3)$. This means that the computation will in general take much more time than moving the data. Consider a series of "pseudo" matrix multiplications Ai×Bi=resulti, to be performed by the DHUs:

matmul_pseudo Result1, $A1, B1$;

$A$ and $B$ are somewhere in $DRAM$ matmul_pseudo Result2, $A2, B2$

...

matmul_pseudo Result$N$, $An, Bn$

Assume that all Ai, Bi, Resulti are ultimately stored in DRAM. The DHUs cannot actually access Ai, Bi or Resulti directly, since they are located in DRAM. In reality, the instruction "matmul" which can be executed by a DHU cannot have an operand Ai because those are in an external store not directly accessible by the DHU. Rather, the operand Ai must first be transferred from DRAM to a buffer accessible by the DHU.

The A1, B1, A2, B2 . . . An, Bn can be loaded ahead of time by direct memory access (DMA) into a buffer accessible by the DHUs. The global An, Bn, can be mapped into the buffer. Similarly Result1, Result2 . . . Resultn can be stored to buffer and then copied by DMA to DRAM. So then the instruction stream is mapped to something that can really run on the DHUs, where Resulti->Resulti_in_buffer, Ai->Ai_in_buffer and Bi->Bi_in_buffer. So the instruction stream becomes:

DMA_copy($Ai$->Ai_in_buffer, $Bi$->Bi_in_buffer); for all $i$

...

*matmul* Result1_in_buffer, A1_in_buffer,

B1_in_buffer; all quantities are in buffer

*matmul* Result2_in_buffer, A2_in_buffer, B2_in_buffer

...

*matmul* ResultN_in_buffer, An_in_buffer, Bn_in_buffer

DMA_copy(Resulti_in_buffer->Result$i$)

These instructions are scheduled subject to normal data flow usage analysis. The first DMA_copy instructions must complete before the corresponding matmul instructions execute. Working backwards, the matmuls required to implement an MLN and their order of execution may be determined and scheduled by the compiler based on the architecture of the MLN. Once that is done, the compiler will know when each data in DRAM is required by the corresponding matmul. The compiler can then schedule the corresponding DMA_copy instructions. Because the compiler can determine this in advance and there are no significant branching, conditions or other run-time dependencies, the compiler can schedule the DMA_copy instructions in an order that it knows will avoid conflicts for DMA access. This, in turn, makes the execution time of the DMA_copy instructions predictable enough and short enough that the DMA_copy instructions can be scheduled in a manner so that the compiler knows that the retrieved data will be available in the buffer before it is used by the statically scheduled matmul instructions.

In this scenario, stalls may still occur if the data is being consumed too quickly for the DMA_copy instructions to keep up. In general this will not occur because the matrix multiplies which dominate the operation of the DHUs are algorithmically slow ($O(n^3)$) compared to the data transfers, as long as the compiler creates large enough multiplies.

The following provides a more detailed example, in which instructions are executed in blocks. FIG. 1A is a block diagram of a system with a machine learning accelerator (MLA) and corresponding compiler. As discussed above, an MLA may be part of an edge device. Example applications for edge devices include automotive and other forms of transportation including autonomous transportation, agricultural, industrial, robotics, drones, surveillance and security, smart environments including smart cities, medical and personalized health. Example tasks include computer vision, image analysis, image understanding, speech recognition, audio analysis, audio understanding, natural language processing, classification and pattern recognition tasks. For edge devices, it may be desirable to perform certain tasks in real-time. In addition to memory and other programmable processors, an edge device may also include sensors, such as cameras (both still image and video cameras), microphones, temperature sensors, pressure sensors and other types of sensors. The sensors may capture samples that are used as inputs to a computing pipeline within the edge device.

The MLA may be executing both memory access instructions (also referred to as DMA instructions in this example) and instructions for computation or data transfer within the MLA (MLA instructions). The compiler 120 receives a description of a machine learning network 100 and generates a computer program 150 that implements the machine learning network using MLA 170. The computer program 150 includes MLA instructions that are executed by processing elements (Tiles) and/or storage elements in the MLA according to a static schedule determined by the compiler. The compiler 120 also schedules DMA instructions so that there is no contention for memory access and, as a result, the compiler can guarantee that the DMA instructions will complete before the execution of any dependent MLA instructions. The compiler 120 partitions the instructions into blocks, which may include both MLA instructions and DMA instructions that implement data transfers for MLA instructions in later blocks.

A set of MLA instructions in a block may be statically scheduled with respect to each other. A set of MLA instructions may be statically scheduled because the compiler can determine which instructions are executed by which elements at what times, as will be explained in greater detail below. For example, for the statically scheduled instructions, there are no conditions, branching or data dependencies that can be resolved only at run-time, and which would affect the timing and order of the execution of the instructions.

Note that the static schedule determined by the compiler may or may not be included as part of the instructions and computer program. In some embodiments, the computer program may expressly include the schedule, specifying that instruction A is executed at cycle X, instruction B is executed at cycle X+4, instruction C is executed at cycle X+12, etc. In alternate embodiments, the computer program may specify only that instruction A is executed, followed by instruction B, and then instruction C, but without any scheduling information. Even though the static schedule is not expressly specified, these instructions will still execute according to the schedule determined by the compiler because the compiler knows how long it takes to execute each instruction. As a result of the static scheduling, the MLA and instruction set for the MLA may be simplified, with the complexity offloaded to the compiler. A simpler MLA can result in lower cost, lower power consumption and higher performance, all of which are desirable for implementation in edge devices.

In more detail, the MLN 100 may be described by an architecture and parameters. A depiction of an MLN is shown to the right of box 100 in FIG. 1A. Most MLNs include multiple layers 112, each with one or more nodes which are represented by circles in FIG. 1A. The lines between nodes in FIG. 1A represent interconnections between the nodes (and layers). Each node calculates a weighted sum of the values received from its connected nodes, possibly also applying a bias. Examples are matrix multiplication and convolution. Each node may also apply certain functionality (operators), such as nonlinear functions (e.g., tan h function), softmax operator, etc. A typical node may compute an output:

$$y = F(\Sigma w_i x_i + b) \tag{1}$$

where $x_i$ are the inputs received from other nodes i, $w_i$ are weights, b is a bias and F( ) is a nonlinear operator. The MLN architecture includes the number of nodes (and layers) and their interconnectivity, and the operators applied at nodes. The operators may be described in a parameterized form. The MLN parameters include the weights, biases, and parameters for the operators.

MLNs may vary in size, depending on the desired task. Small MLNs may have 5-10 or fewer layers, medium size MLNs may have 30-50 layers, and large MLNs may have 100 or more layers. Examples of inputs include text, images and video. Some of the layers may be fully interconnected (i.e., every node in one layer provides input to every node in the next layer), and others may be more locally interconnected (e.g., to implement convolutions). Each weighted interconnect represents a scalar multiplication. The total number of scalar multiplications required to implement an MLN may be on the order of millions, billions, tens of billions or even more. These may be carried out by matrix multiplications.

The MLA 170 includes a plurality of Tiles 180 and an on-chip memory system with storage elements (not shown in FIG. 1A) implemented on a semiconductor die. The Tiles are organized into one or more meshes of interconnected Tiles. A depiction of a Tile mesh is shown to the right of box 170 in FIG. 1B. In each mesh, the Tiles 180 are organized in a regular pattern and the interconnections within each mesh provide data transfer paths between Tiles in the mesh. The Tiles execute computations according to instructions received by the Tiles and using data stored in the on-chip memory system. These instructions may be for computations and/or for data transfer. Computations include multiply (including matrix multiply), add, and operators (e.g., non-linear functions, lookup table, min/max, pooling). These are computations that implement the MLN. In the example of FIG. 1A, the computations performed by layers 112A-D are allocated to groups 182A-D of Tiles as indicated. The allocation is not required to be 1:1. For example, multiple layers could be allocated to a single Tile or vice versa. Not every computation required to implement an MLN need be executed by a Tile; some computation may be executed outside the MLA (e.g., floating point operations, if the Tiles only do integer arithmetic). Tiles typically will at least perform matrix multiplication.

The compiler 120 receives a description of the MLN 100 and generates a computer program 150 that implements the MLN using the MLA 170. The computer program 150 receives an input sample for the MLN and executes the operations of the MLN to produce the output for the MLN. The computer program 150 includes instructions to be executed by the Tiles for implementing computations in the MLN and may also include instructions to be executed by other elements, such as a controller outside the Tiles. For additional examples and description of the MLA and related components, see U.S. application Ser. No. 16/840,216, "Machine Learning Network Implemented by Statically Scheduled Instructions, with Compiler," which is incorporated by reference herein in its entirety.

As shown at the bottom of FIG. 1A, the compiler 150 partitions the instructions into blocks 195A-E of instructions. Each block 195 typically has a set of statically scheduled MLA instructions that are executed by processing elements and/or storage elements in the MLA. Blocks may also include DMA instructions, such as fetching data from off-chip memory. The set of statically scheduled instructions in a block may depend on DMA instructions in previous blocks. For example, computations performed by Tiles may depend on data retrieved from off-chip memory. In one approach, the blocks are executed in order and with known durations so that the relevant DMA instructions in previous blocks are known to complete before the data is required by MLA instructions in the current block. As a result, the Tile computations may be executed according to the static schedule, because it is known that any required data has been retrieved from off-chip memory.

Returning to FIG. 1A, the set of MLA instructions in a block may include a series of computations required to implement a portion of the MLN, where the time required for each computation and associated data transfers within the MLA is known. As a result, the compiler may statically schedule the Tile instructions within that set relative to the other Tile instructions in the set. The resulting computer program produced by the compiler then implements an allocation of instructions to Tiles and a schedule for executing the instructions as determined by the compiler, although these may not be expressly contained with the computer program. In the example of FIG. 1A, the computations performed by layers 112A-D are allocated to groups 182A-D of Tiles as indicated.

Figure 1B:
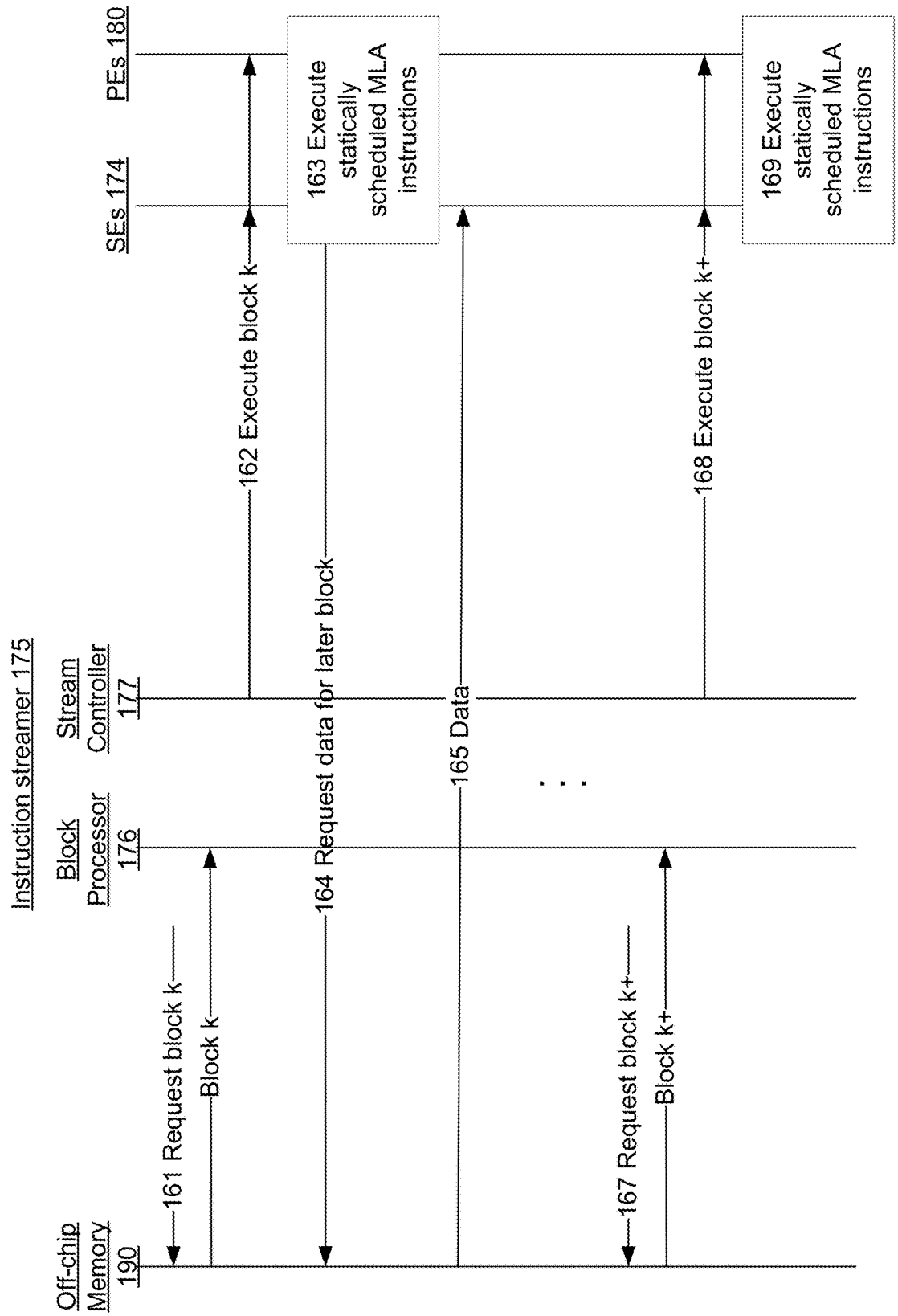
FIG. 1B is an event trace illustrating coordination of DMA and MLA instructions using blocks.

The computer program may also include DMA instructions. For example, DMA instructions may include data fetch from off-chip memory. FIG. 1B is an event trace illustrating coordination of DMA and MLA instructions using blocks. In this example, the MLA 170 includes storage elements 174 such as SRAM, processing elements 180 (Tiles), and an instruction streamer 175. The instruction streamer handles the processing of blocks and includes a block processor 176 and a stream controller 177. These will be described in more detail below. The overall system also includes off-chip memory 190, such as DRAM.

The event trace of FIG. 1B begins by requesting 161 a block k from off-chip memory 190. The block k is retrieved to the MLA and processed by instruction streamer 175. The block processor 176 receives the block. The block includes a set of statically scheduled MLA instructions and may also include DMA instructions that retrieve data for the MLA instructions in later block(s). The block processor 176 places the instructions into queues. The block k may also specify the duration for execution of the statically scheduled MLA instructions in the block.

The stream controller 177 controls streaming of the instructions from block k, which controls the execution of the instructions. The stream controller 177 starts execution 162 of the instructions in block k. This includes execution 163 of the statically scheduled MLA instructions in block k, because the stream controller assumes that all required DMA instructions from prior blocks have already been executed. Accordingly, execution 163 of the MLA instructions may proceed without first confirming availability of the data retrieved from off-chip memory. Alternatively, data availability may be confirmed as an additional safeguard, even though not required.

Block k may also include DMA instructions to be executed by the storage elements 174 for later blocks. On execution of block k, the storage elements 174 also request 164 data from the off-chip memory 190. The compiler knows that the DMA requests 164 are scheduled and may be executed without resulting in conflicts for DMA access. Thus, the stream controller 177 and storage elements 174 may execute the DMA instructions 164 assuming that access to the off-chip memory is available, and the DMA instructions 164 may be executed without the need for run-time contention resolution, arbitration or congestion avoidance. As a result, the DMA requests 164 are known to complete 165 before the retrieved data is required by the MLA instructions in later blocks. When the later block (denoted as block k+ in FIG. 1B) is requested 167 and received, the stream controller 177 can start execution 168 of block k+, including the statically scheduled MLA instructions 169, based on the assumption that the DMA requests 164 from block k have already completed and the relevant data is available in the SEs.

FIG. 1C is a simplified example using three blocks of instructions, labelled BLOCKS 1-3. Each block includes a header and a body of instructions. The header includes a block size which specifies the number of instructions in the block, and a block duration which specifies the number of cycles required to execute the statically scheduled MLA instructions in the block. The instructions are described in five columns. The Ref column is a reference number for each of the instructions. The Dest(ination) column lists the storage element (SE) or processing element (PE) that executes the instruction. The Instruction column contains the instruction. The Cycle column is the schedule for executing the instructions in the block. The Comment column indicates which instructions are DMA instructions and for which block the data is required. The Ref and Comment columns are added for purposes of explanation.

For example, block 1 instructions 4, 5 are the statically scheduled MLA instructions. Block 1 instructions 1, 2, 3 are DMA instructions which load data from off-chip memory for use by blocks 2 and 3. Therefore, the header for block 1 specifies a block size of 5 instructions and the statically scheduled MLA instructions 4, 5 will complete execution by the end of cycle 5. It is a short duration, because block 1 is setup without any computation. The Cycle column indicates that once block 1 begins execution, instruction 1 will be released for execution in cycle 1, instruction 2 will be released in cycle 1, and instructions 3, 4, 5 will be released in cycles 2, 3, 3, respectively. When block 1 executes, instructions 1, 2, 3 retrieve data for blocks 2 and 3.

Block 2 is dependent on block 1 instructions 1, 2. Before the statically scheduled MLA instructions 2-9 of block 2 can execute, the required data must have been retrieved from DRAM. Specifically, block 2 instruction 2 is dependent on block 1 instruction 2, and block 2 instruction 3 is dependent on block 1 instruction 1. At run-time, block 2 executes automatically, assuming that the block 1 DMA instructions have already completed and without checking for their completion. For these startup blocks, because block 1 executes in a short duration, the DMA instructions may not have completed after 5 cycles. For example, assume that the DMA instructions require 400 cycles to complete. In one approach, the block duration for block 1 may be increased from 5 cycles to 400 cycles, and the stream controller just waits until 400 cycles for block 1 have elapsed. Alternatively, no-ops may be added to block 1 to increase the duration to 400 cycles. In yet another approach, a wait instruction may be issued between blocks 1 and 2.

Note that, strictly speaking, block 2 may start execution before the DMA instructions in block 1 complete, so long as the data is available in time for the block 2 instructions. For example, if block 2 instruction 6 was the instruction dependent on the block 1 instruction 1 DMA transfer, then block 2 might start execution after 300 cycles. At that point, the DMA transfer has not yet completed, but instruction 6 does not execute until cycle 100 and the 400 cycle DMA transfer will complete by that time.

Block 2 instruction 1 is a DMA instruction for block 4. The block duration for block 2 is longer than for block 1, because some computation is performed in block 2.

Block 3 has DMA instruction 1 for block 4 and MLA instructions 2-4. The block 3 MLA instructions are dependent on the DMA transfer in block 1 instruction 3. Because block 2 computations take many cycles, that DMA transfer will have completed by the time block 3 is ready to execute. Similarly, because block 3 takes some time to complete, the DMA instruction 1 in block 3 will have completed by the time that block 4 is ready to execute.

Figure 2:
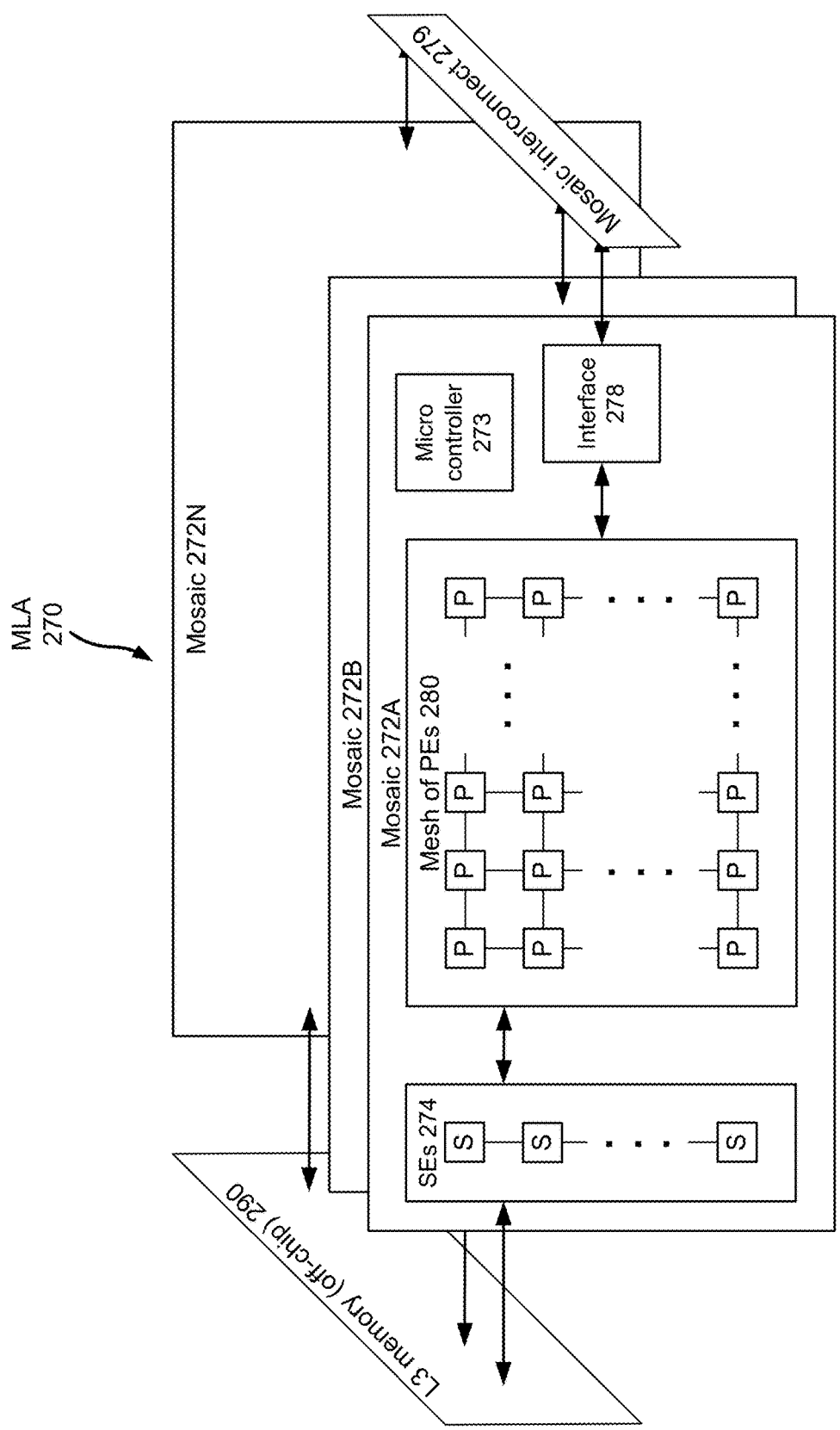
FIG. 2 is a block diagram of a hardware system including an MLA.
Figure 3A:
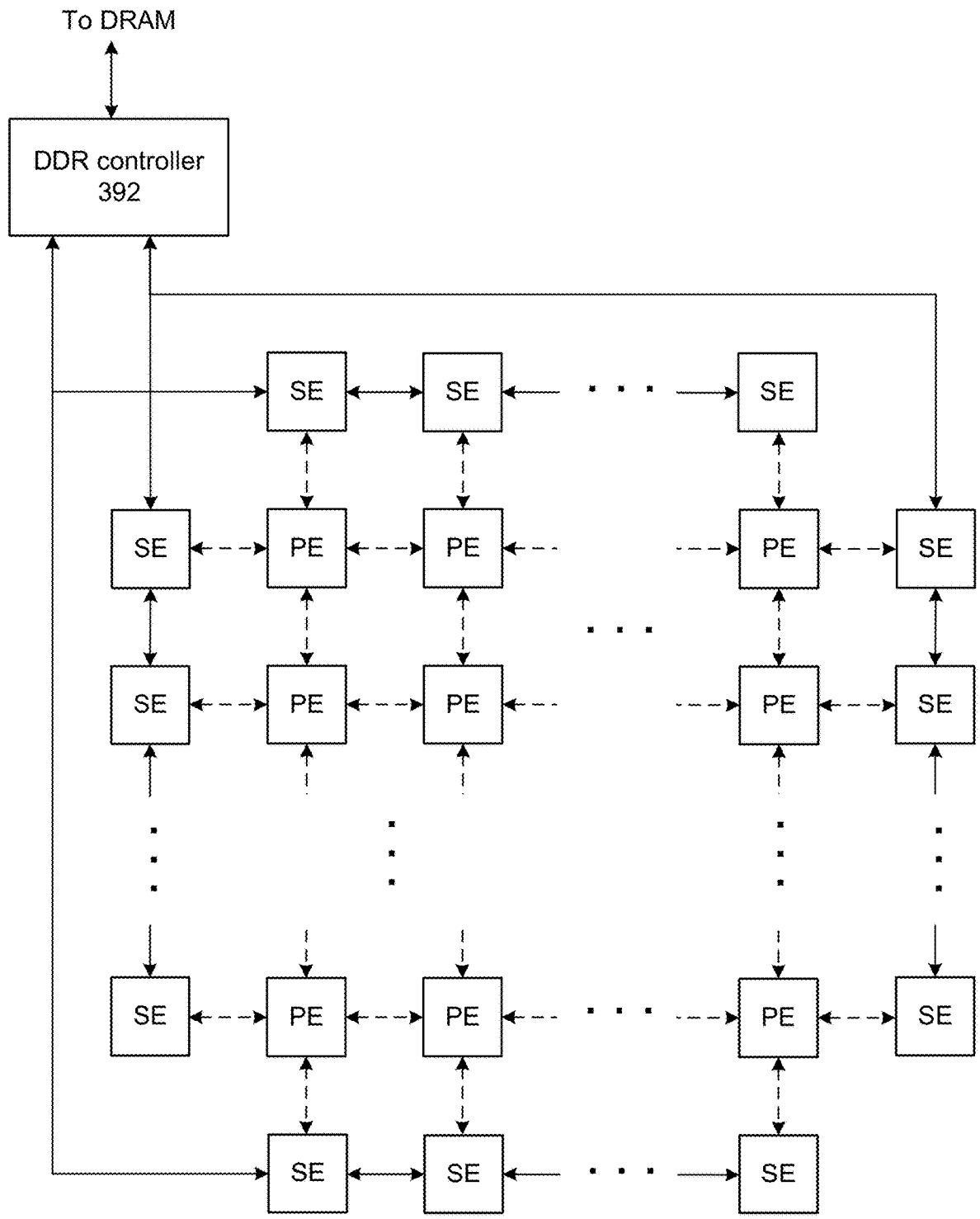
FIG. 3A is a block diagram of a DDR controller, processing elements (PEs) and storage elements (SEs) within an MLA, showing data paths.
Figure 3B:
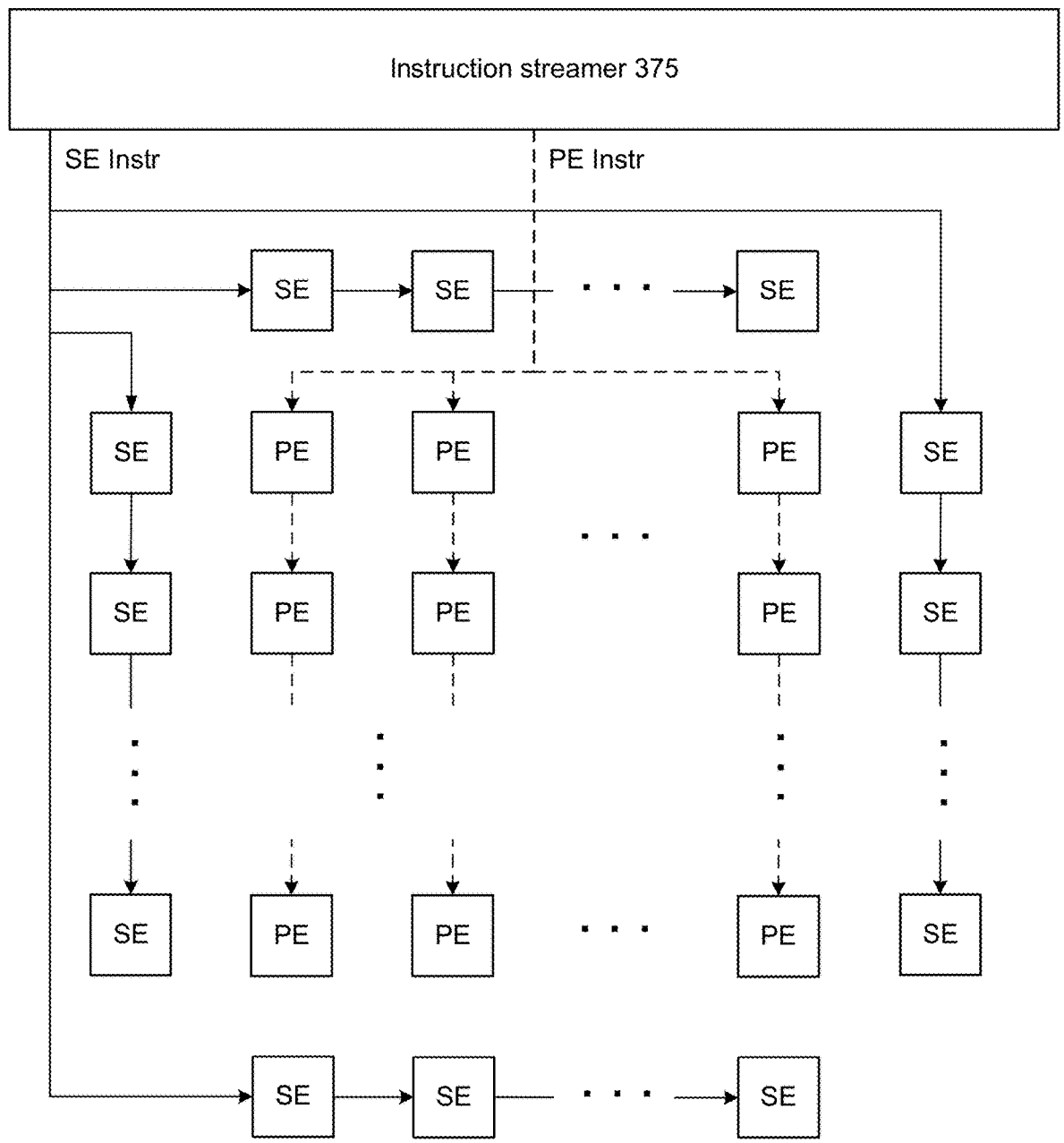
FIG. 3B is a block diagram of an instruction streamer, PEs and SEs within an MLA, showing instruction paths.
Figure 3C:
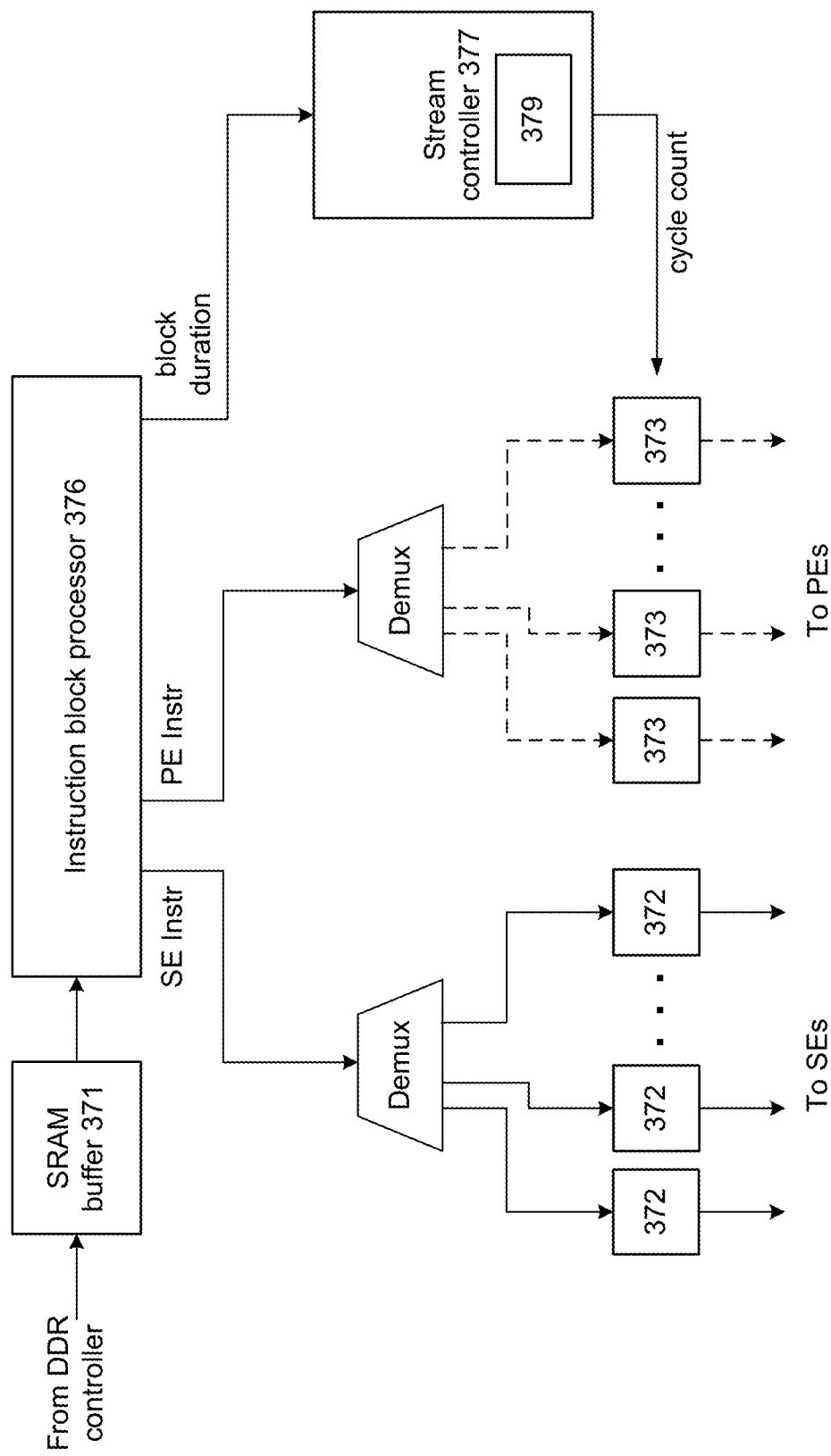
FIG. 3C is a block diagram of an instruction streamer.
Figure 3D:
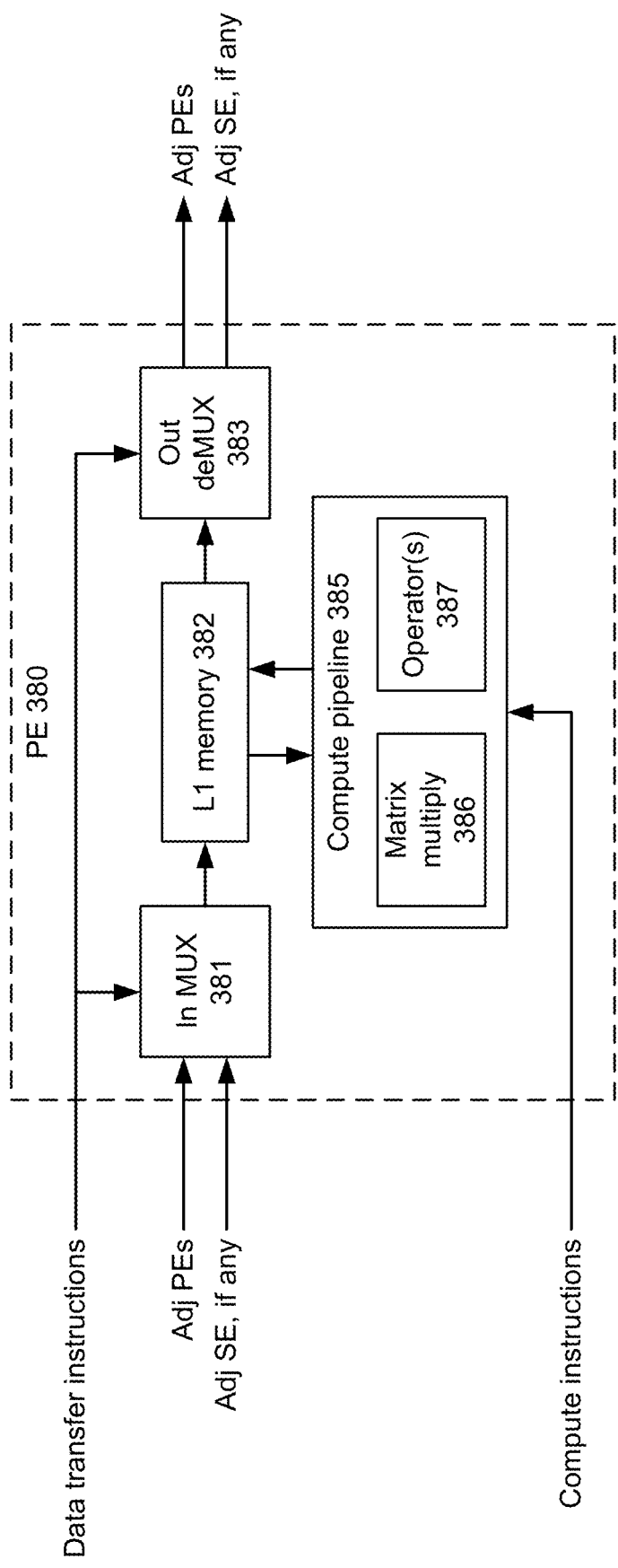
FIG. 3D is a block diagram of a PE within the MLA.
Figure 4:
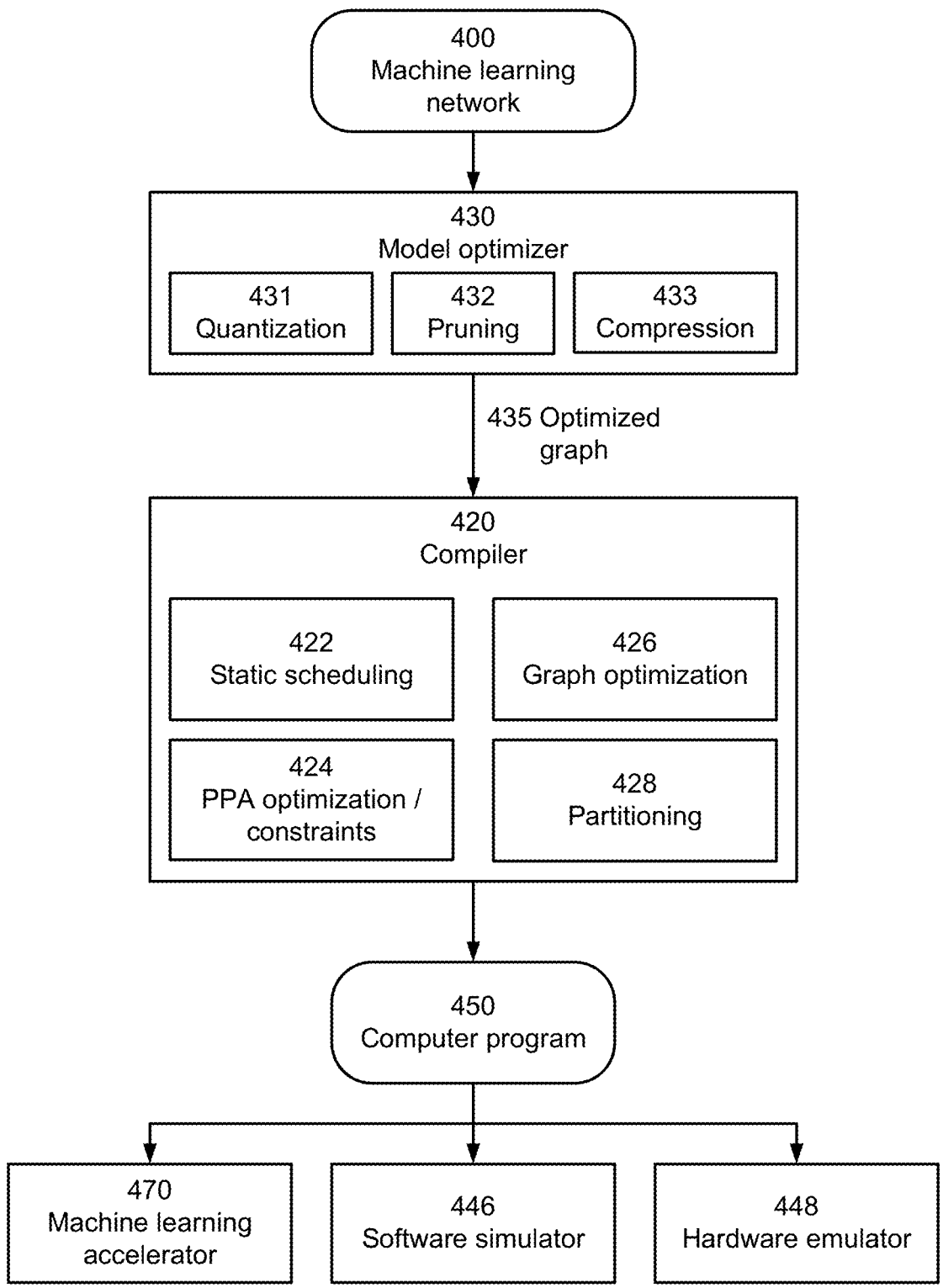
FIG. 4 is a block diagram of a software development environment including a machine learning compiler.

FIGS. 2-4 are more detailed descriptions of an example system that includes an MLA and corresponding compiler. FIGS. 2-3 show the hardware component and FIG. 4 shows the software development environment.

FIG. 2 is a block diagram of a hardware system including an MLA 270. The MLA 270 includes all the components shown in FIG. 2A, except the off-chip level 3 (L3) memory 290. The MLA components are implemented on a single die as part of a single chip. The MLA 270 includes one or more mosaics 272A-N. In this example, all of the mosaics are the same. Each mosaic 272 includes a mesh of processing elements (PEs or Tiles) 280, an on-chip memory system and a controller 273. In FIG. 2, the on-chip memory system is a multi-level memory system, which includes a level 1 (L1) memory distributed among the Tiles (see FIG. 3C) and a level 2 (L2) memory 274 shared by the Tiles. The L2 memory 274 includes storage elements SEs. If there are multiple mosaics 272, the MLA 270 may include a dedicated interconnect 279 for connecting the different mosaics. Each mosaic also includes an interface 278 to the interconnect 279.

FIGS. 3A-3D are block diagrams of example components within the MLA. FIG. 3A is a block diagram of a DDR controller 392, processing elements (PEs) and storage elements (SEs), showing data paths within an MLA. The PEs are arranged as a two-dimensional array, and the SEs are arranged as a ring around the outer edge of the PEs. Data can be transferred as follows, as shown in FIG. 3A. Within the mesh of PEs and SEs, data may be transferred between neighboring elements, whether they are PEs or SEs. This is indicated by the dashed arrows. In this particular architecture, data may also be transferred by daisy chain, as described in further detail below. Data transfer to and from off-chip memory (e.g., DRAM) is via the DDR controller 392. In this particular architecture, only one SE along each edge has direct accesses the DDR controller 392, as indicated by the solid arrows from the DDR controller 392. The remaining SEs have daisy-chained access to DRAM, as indicated by the solid arrows between SEs.

The MLA may have a large number of PEs and SEs, for example 100 or a 1000 or more PEs and a corresponding number of SEs. Accordingly, it is not feasible for each PE/SE to have a dedicated port to every memory bank of the DRAM. However, by scheduling DRAM accesses without contention, the net effect is that every PE/SE effectively has a dedicated (virtual) port to the off-chip memory.

Instruction transfer from instruction streamer 375 is implemented by daisy chain, as shown in FIG. 3B. The instruction streamer 375 provides direct transfer to one SE along each edge and to one PE at the head of each column, as indicated by the solid arrows from the instruction stream 375 for SEs and the dashed arrows for PEs. These instructions may be passed to other SEs or PEs, as indicated by the arrows between SEs and between PEs.

FIG. 3C is a block diagram of the instruction streamer 375, including the block processor 376 and stream controller 377. Blocks retrieved from the DRAM are buffered in SRAM 371. The block processor 376 processes these blocks as follows. SE instructions are sent to SE queues 372 and PE instructions are sent to PE queues 373. The instructions are held in queue until the block is permitted to start execution. There are multiple queues, so that instructions for multiple blocks may be queued concurrently. The block duration is sent to the streaming controller 377. There may be certain conditions for execution of a block. For example, the execution of the prior block (referring to the statically scheduled instructions in the block) must complete before execution of the current block begins. The streaming controller 377 uses the block duration to determine when a block has completed execution. Another condition is that the instructions for the block must be available in the SE and PE queues.

In this example, the streaming controller 377 produces a cycle count for release of the instructions from the queues. Referring to the example of FIG. 1C, once the conditions for block 2 have been met, a local counter 379 in the streaming controller starts a cycle count. Instructions 1 and 2 are released from the queue at cycle 1, instruction 3 at cycle 2, etc.

Other architectures will be apparent. For example, instructions in a block could be forwarded and stored in the PEs and SEs rather than in queues within the instruction streamer. Execution of the instructions may be triggered by a pulse or other signal to the PEs/SEs.

FIG. 3D is a block diagram of a PE 380 within the MLA. In this example, all the Tiles are similar. Each Tile 380 includes an L1 memory 382. Each Tile 380 also includes a data transfer pipeline that executes instructions for transferring data to and from the L1 memory 382. Here, the Tiles 380 are arranged in a rectangular array as shown in FIG. 3A, with each Tile connected to its adjacent neighbors. Interior Tiles are connected to four adjacent Tiles. Edge Tiles are connected to adjacent Tiles and also to SEs 374. In FIG. 3D, the L1 memory 382 may receive data from any of its adjacent Tiles and/or from a SE if it is an edge Tile. Similarly, it may transfer data to any of its adjacent Tiles and/or to an SE if it is an edge Tile. The data transfer operations are controlled by data transfer instructions received and executed by the Tiles.

Each Tile 380 also includes a compute pipeline 385 for executing computations using data stored in the L1 memory 382. The L1 memory acts as software-configurable registers for the compute pipeline 385. The compute pipeline 385 includes matrix multiplication circuitry 386, such as a systolic array, and circuitry for implementing different types of operators 387. The computations are controlled by compute instructions received and executed by the Tiles.

In this particular example, the data transfer instructions and compute instructions executed by the Tiles are statically scheduled. These instructions include data transfer between L1 memories in different Tiles, and data transfer between L1 memory and L2 memory (SEs). Data transfer instructions may specify one hop at a time (e.g., transfer data to the east neighbor Tile) or may specify destination and path through intermediate Tiles (e.g., transfer data to Tile (5,5) using path east-east-north-north-east). The instructions also include matrix multiplies performed by the Tiles and operators applied by the Tiles. These operations do not require very many different instructions to implement, so the overall instruction set may be fairly small, for example not more than 30 instructions, or not more than 50 instructions.

The L3 memory 290 of FIG. 2 is off-chip. In this example, the L1 and L2 memories (SEs) are implemented as on-chip SRAM and the L3 memory is implemented as DRAM (flash memory and SSD drives are other alternatives). Because the L1 and L2 memories are implemented as SRAM, the data transfers between L1 memories or between L1 and L2 memories have deterministic timing, so these data transfer instructions can be statically scheduled by the compiler.

In one approach, the instructions in the computer program and the data required for computation (e.g., input, weights, biases, parameters for operators) are initially loaded into L3 memory. Data is transferred between L3 memory and L1/L2 memory using blocks as described above. Once this data is loaded into L1/L2 memory, the Tiles execute the corresponding instructions according to a static schedule.

The approach based on static scheduling described above is not restricted to the examples described above. For example, different network topologies of Tiles and storage elements may be used.

FIG. 4 is a block diagram of a software development environment including a machine learning compiler 420. In this example, the software development environment also includes a model optimizer 430. The model optimizer 430 receives a description of the MLN 400 and produces an optimized graph 435 of the MLN. It may apply optimizations such as quantization 431, pruning 432 and/or compression 433. Quantization 431 reduces the resolution of calculated values. For example, floating point values may be quantized to a certain number of bits and then integer math used instead of floating point math. This reduces the complexity and power consumed by the Tiles. Pruning 432 removes parts of the MLN that do not contribute significantly to the overall results. For example, if certain weights are zero or close to zero, those weighted interconnects may be pruned. Finally, because MLNs contain a large amount of data, compression may be used successfully to reduce data transfer bandwidths.

The resulting optimized description 435 of the MLN may be expressed as a graph, in which the nodes of the graph represent nodes in the MLN and the edges of the graph represent the weighted interconnects. The compiler 420 receives the optimized graph 435 and produces the resulting computer program 450. The compiler 420 may perform operations including static scheduling 422, PPA (power performance area) optimizations 424, graph optimizations 426 and/or partitioning 428.

In order to statically schedule 422 the MLA instructions, the compiler typically will know the duration of each instruction (i.e., how long each instruction takes to execute), the capabilities of each element (which processing elements and storage elements can execute which instructions), the topology of data transfer paths to and from Tiles (including between Tiles, and between Tiles and on-chip memory), and the computations required and their dependencies (i.e., the MLN description). With this information, the compiler can schedule unconditional start times for the MLA instructions. Here, unconditional refers to run-time conditions. The execution order of statically scheduled instructions will not change as a result of run-time conditions, branching or dependence on input values. As a result, compute instructions may be scheduled for start times when all of the required data for the computation is known to be available and the compute pipeline is also known to be available. The need for run-time determination of whether data has arrived and whether the compute pipeline is available may be avoided. Analogously, data transfer instructions may be scheduled for start times when the data transfer path is known to be available. The need for circuitry to handle arbitrations, or to check for or resolve contentions and collisions on shared data transfer paths at run-time may be avoided. The need for routing tables and other circuitry to determine routing at run-time may also be avoided.

The same approach may be extended to transfers to/from the remote memory due to the predictable order and timing of machine learning computations. The need for run-time determination of whether data has been retrieved from remote memory may be avoided. Data transfer instructions to/from remote memory may be scheduled for start times when the data transfer path (i.e., DMA access) is known to be available. The need for circuitry to handle arbitrations, or to check for or resolve contentions and collisions on shared data transfer paths at run-time may be avoided. The need for routing tables and other circuitry to determine routing at run-time may also be avoided.

PPA optimization 424 includes different optimizations of the computer program 450. For example, the allocation of MLN computations to Tiles may be optimized to reduce power consumption, to increase performance (such as reducing latency or increasing throughput) and/or to reduce area (e.g., number of Tiles used). The compiler 420 may also optimize 424 the computer program 450, subject to constraints on power, performance, area and/or any of the quantities described above. Graph optimization 426 includes analysis of the graph representing the MLN to prune, merge or quantize links, parameters, values, and layers to achieve better performance. Partitioning 428 concerns mapping the computations in the MLN to an implementation on the MLA. This includes determining which computations are allocated to which Tiles and how data flows through the mesh of Tiles during computation. If there are multiple mosaics, it also includes determining which computations are allocated to which mosaics.

The resulting computer program 450 may be loaded into memory for execution on a machine learning accelerator 470. For example, one possible application is object detection. In this case, the inputs are images captured by a video camera. The MLN 400 has been trained to identify certain objects in the video images. The computer program 450 implementing the MLN is loaded onto memory that is accessible by the MLA 470, which is implemented as a chip inside the camera. This way, images captured by the video camera may be immediately analyzed by the computer program 450 running on the MLA 470.

In addition to the MLA 470, the computer program 450 or parts of it may be run on a software simulator 446 and/or hardware emulator 448 (including FPGAs configured as MLAs). These may be used for product development, debugging and/or prototyping. For some purposes, a full simulation or emulation is not necessary. For example, to check that there are no collisions or conflicts between statically scheduled instructions, only the flow of data may be simulated or emulated. It is not necessary to compute actual values.

Figure 5:
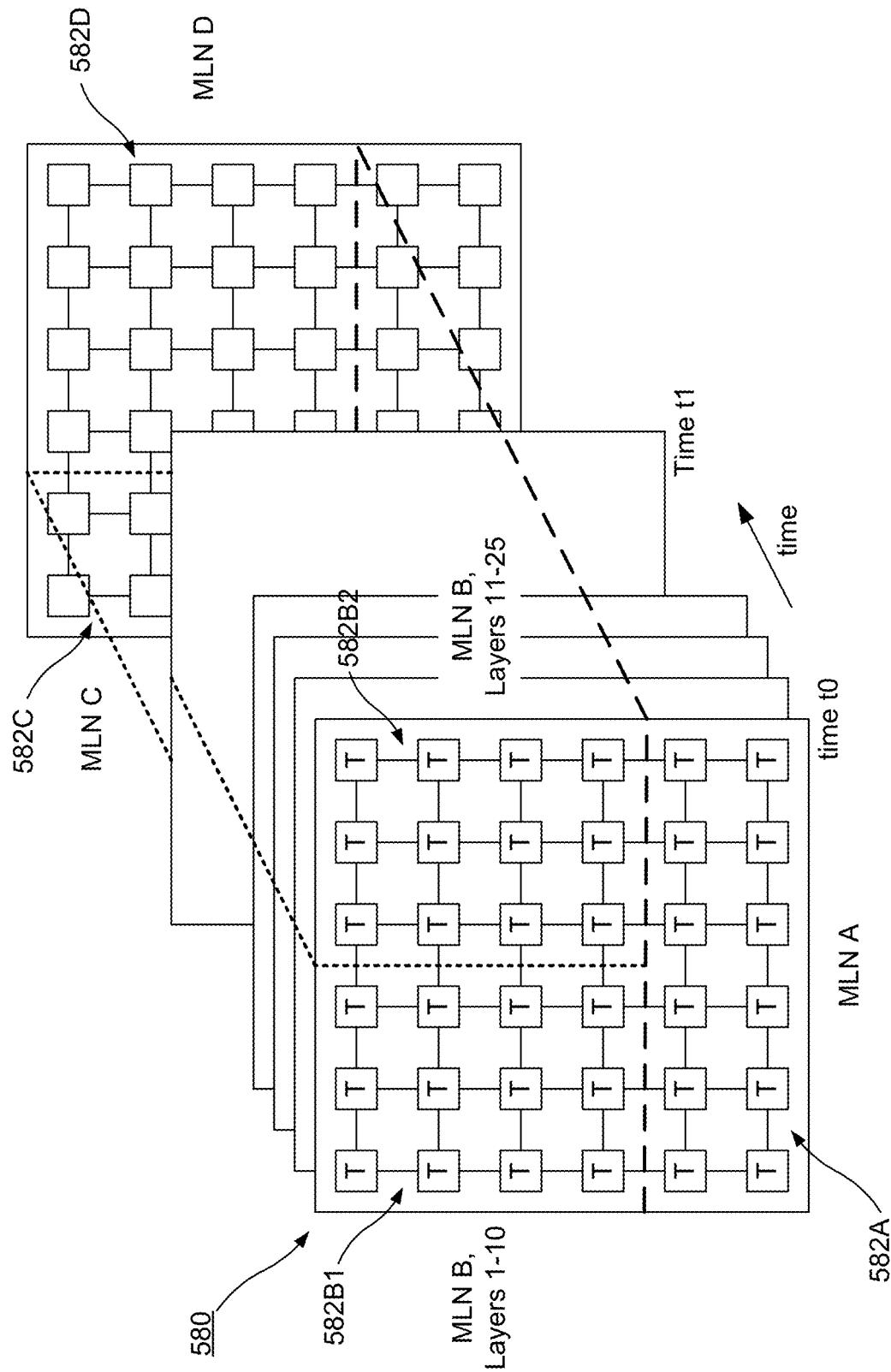
FIG. 5 is a block diagram of an MLA with a 6×6 mesh of Tiles.

The embodiments described above may be used to execute a single MLN. However, the MLA is enabled to execute multiple MLNs. FIG. 5 illustrates partitioning the mesh of Tiles to different subnets of an MLN and to different MLNs. In FIG. 5, the MLA includes a 6×6 mesh (element 580 in FIG. 5A). From time t0 to t1, the mesh 580 is utilized to implement two different MLNs: MLN A and MLN B. The Tiles are divided into three partitions 582A, 582B1, and 582B2. Partition 582A implements MLN A, partition 582B1 implements the first 10 layers of MLN B, and partition 582B2 implements the remaining 15 layers of MLN B. MLN B may be partitioned in this manner because some off-Tile operations may be required between layers 10 and 11. Maybe the output of layer 10 requires a computation that is performed off-Tile in a non-deterministic manner, or maybe layers 11-25 require data that cannot be loaded in a manner consistent with the static scheduling of layers 1-10. After time t1, the mesh 580 continues to implement MLN B using partition 582A, but MLN A is replaced by MLNs C and D using partitions 582C and 582D, respectively.

FIG. 5 shows a progression over time. The front diagram shows the partitioning at an earlier time and the subsequent diagrams show the partitioning at later times. The times are indicated to the lower right of the diagrams. At time t0, the mesh is partitioned so that the bottom 2×6 Tiles implement MLN A, the upper left 4×3 Tiles implement MLN B layers 1-10, and the upper right 4×3 Tiles implement MLN B layers 11-25. At time t1, MLN B is no longer required and is replaced by MLNs C and D. 11-25. The upper left 4×2 Tiles now implement MLN C, and the upper right 4×4 Tiles now implement MLN D.

Figure 6:
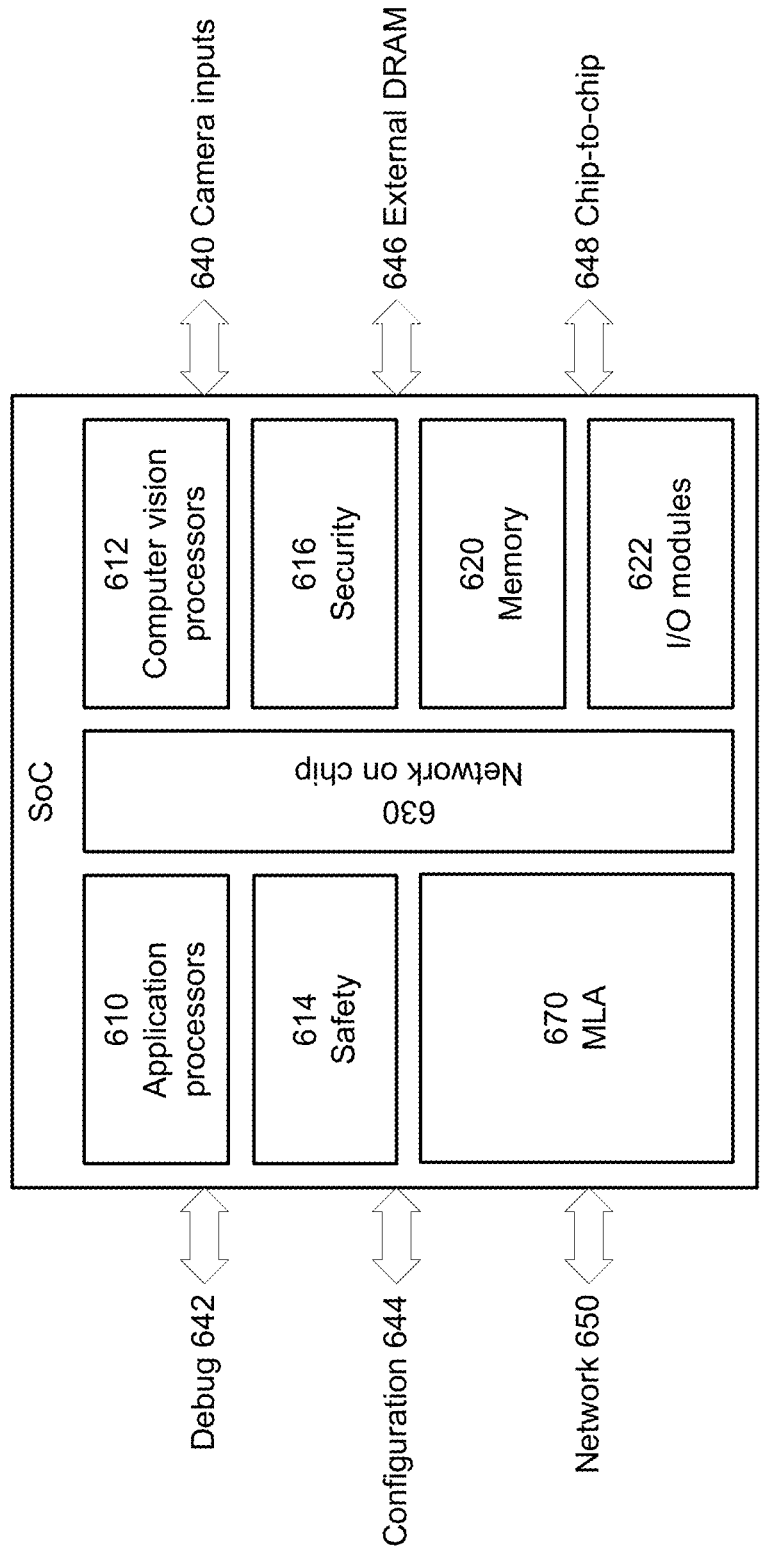
FIG. 6 is a block diagram of an integrated circuit that includes an MLA.

As discussed above, the MLA includes various components that are on the same die. The MLA may be integrated into a larger integrated circuit product (e.g., as part of an edge device). FIG. 6 is a block diagram of an integrated circuit that includes an MLA 670. Other components may be included on the same die as the MLA. This example includes the following additional blocks: application processor 610 (e.g., general purpose CPU running applications), computer vision processor 612 (or other types of application-specific processors), safety 614, security 616, additional SRAM (memory) 620 and input/output circuitry 622. It also includes a network 630 for communication between the different components. This type of semiconductor chip may be referred to as a system-on-chip (SoC).

The connections to the external world include camera inputs 640 for the computer vision processors, ports for debug 642 and configuration 644, a connection 646 to external memory (e.g., DRAM), chip-to-chip connections 648, and network connections 650 (e.g., Ethernet and PCIe).

The SoC of FIG. 6 may be combined with other components to perform various tasks in edge devices. Example applications for edge devices include automotive and other forms of transportation including autonomous transportation, agricultural, industrial, robotics, drones, surveillance and security, smart environments including smart cities, medical and personalized health. Example tasks include computer vision, image analysis, image understanding, speech recognition, audio analysis, audio understanding, natural language processing, classification and pattern recognition tasks. For edge devices, it may be desirable to perform certain tasks in real-time.

In addition to memory and other programmable processors, an edge device may also include sensors, such as cameras (both still image and video cameras), microphones, temperature sensors, pressure sensors and other types of sensors. The sensors may capture samples that are used as inputs to a computing pipeline within the edge device. For example, image samples may be input to the computer vision processors 612, which perform initial operations such as edge detection and enhancement, contrast enhancement, motion detection, and optical flow. Raw and/or processed images may be then input to the MLA 670 for analysis by the machine learning network. The MLA may also receive other inputs, such as metadata from other sources and data from other sensors. The application processors 610 may also perform various functions in the overall pipeline and may also serve as a master controller that coordinates operation of the MLA and the other programmable processors in the pipeline.

Edge devices may be portable with less power available for computations compared to, for example, cloud-based server farms. It may also be desirable for the computing pipeline within the edge device to perform tasks without utilizing cloud-based or other remote compute resources. In some implementations, the MLA implements computations in the machine learning network at a speed of at least 50 TOPs (50 trillion operations per second) at a power consumption of not more than 5 watts. The speed may be increased by increasing the number of Tiles in the mesh or the number of Tile meshes on the die.

Figure 7:
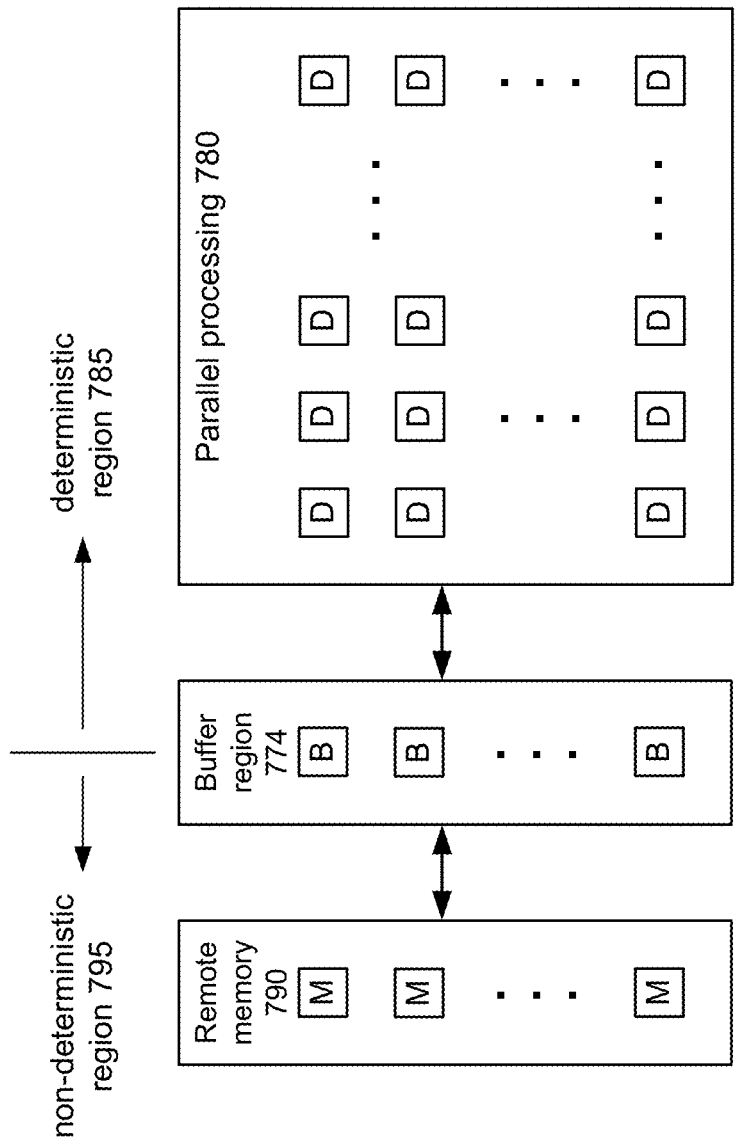
FIG. 7 is a block diagram of another system with predictable memory access.

The description above uses an example of MLNs implemented by an MLA, but the principles may also be applied to other parallel processing situations. FIG. 7 is a block diagram of a generalized system that may take advantage of the principles described above. The system includes a parallel processing fabric 780 that includes a large number of elements D referred to as data handling units (DHUs). The DHUs may perform computations, or they may store or transfer data, or combinations. Examples include the PEs and SEs described in the previous examples. The DHUs execute instructions from a computer program. The instructions are deterministic in their execution and the order of instructions is predictable enough that the instructions may be statically scheduled for execution by the DHUs.

The statically scheduled instructions use data that is stored in remote memory 790, such as the DRAM or L3 memory described in the previous examples. The remote memory 790 typically has longer and/or more unpredictable access times compared to memories in the deterministic region 785. The remote memory 790 may have multiple banks M, each with its own port(s). Each DHU does not have a dedicated port to every memory bank M. Rather, access to memory 790 is shared by the DHUs. Generally, there may be contention between DHUs for access to memory 790. In such a case, the access time becomes too unpredictable relative to the statically scheduled instructions executed by the DHUs. Under these conditions, the system shown may be divided into a deterministic region 785 and a non-deterministic region 795. Buffers 774 bridge the two regions. In the examples above, the SEs play the role of buffers 774.

However, these are different classes of computer programs. "Regular" programs are programs that regularly repeat a set of instructions (e.g., loops). "Predictable" programs are regular programs that repeat in a predictable fashion, meaning it is possible to predict at compile time exactly what data from memory accesses will be required at what time. Matrix multiplication is a regular, predictable program.

For regular, predictable programs, it is possible to statically predict at compile-time when every memory access will be needed. As a result, instruction scheduling (which can include changing the order of instructions, removing instructions, inserting instructions, and/or changing instructions) can be performed in a manner that guarantees delivery of data from memory 790 when needed. Instruction scheduling guarantees correctness, rather than just improving performance. This eliminates the need for stalling mechanisms. A benefit of this is a significant simplification of the memory subsystem, allowing the complexities of the networking and the stall-til-completed logic to be eliminated. The instruction streams of the DHUs can be scanned and data access needs can be accumulated and scheduled for execution before the actual instructions that need the data. Since the program is predictable, at any time during execution, the compiler knows what data will be consumed by which DHUs. The memory access instructions then transfer data from remote memory 790 to buffers 774 in guaranteed time for their consumption. The data are then within the deterministic region 785, allowing use of the data by statically scheduled instructions. One advantage of this approach is that coding of the deterministic instructions can be done as if the remote memory is directly accessible from the DHUs. In effect, each DHU has a virtual dedicated port to the remote memory 790. There is no restriction on locality of the data retrieved from remote memory.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. For example, the techniques are not limited to the implementation of machine learning inference on edge devices. They may also be used for other aspects of machine learning such as training, for non-edge devices such as devices in data centers, and for applications other than machine learning. Therefore, the scope of the invention should be determined by the appended claims and their legal equivalents.

What is claimed is:

1. A computer-implemented method for implementing a machine learning network on a machine learning accelerator (MLA), the method comprising:
   receiving a description of the machine learning network; and
   generating a computer program from the received description, the computer program implementing the machine learning network on the MLA;
   wherein the MLA comprises a mesh of interconnected data handling units (DHUs) implemented on a semiconductor die; the computer program comprises (a) MLA instructions for execution by the DHUs for implementing the machine learning network; and (b) memory access instructions for retrieving data from off-chip memory for use by the MLA instructions, wherein the DHUs share access to the off-chip memory; and generating the computer program comprises, by a compiler prior to run-time:
   statically scheduling the MLA instructions, wherein the statically scheduled MLA instructions are executed by the DHUs with no run-time conditions, branching or dependencies; and
   scheduling the memory access instructions so that (i) there is no contention by DHUs for access to the off-chip memory, (ii) because there is no contention, the memory access instructions have known duration at time of scheduling, and (iii) given the known duration, the memory access instructions are scheduled early enough that, at time of scheduling, it is known that the retrieved data will be available in the DHUs before the retrieved data is used by the statically scheduled MLA instructions.

2. The computer-implemented method of claim 1 wherein the off-chip memory is dynamic random access memory (DRAM).

3. The computer-implemented method of claim 2 wherein, as a result of scheduling the memory access instructions, the DHUs effectively each have a dedicated port to the off-chip memory.

4. The computer-implemented method of claim 1 further comprising:
   executing the MLA instructions, assuming that data retrieved from off-chip memory is available.

5. The computer-implemented method of claim 4 wherein executing the MLA instructions occurs without first confirming availability of the data retrieved from off-chip memory.

6. The computer-implemented method of claim 1 further comprising:
   executing the memory access instructions, assuming that access to the off-chip memory is available.

7. The computer-implemented method of claim 6 wherein executing the memory access instructions occurs without run-time contention resolution, arbitration or congestion avoidance for access to the off-chip memory.

8. The computer-implemented method of claim 1 wherein the DHUs comprise processing elements (PEs) and storage elements (SEs); the MLA instructions comprise (a) compute instructions for execution by the PEs for executing computations in the machine learning network and (b) data transfer instructions for execution by the PEs and/or SEs for data transfer between PEs and/or SEs; and the memory access instructions are for execution by SEs.

9. The computer-implemented method of claim 8 wherein:
   statically scheduling the MLA instructions comprises statically scheduling instructions within each of a plurality of blocks of MLA instructions, wherein each block of MLA instructions comprises a set of (i) compute instructions and (ii) corresponding data transfer instructions that transfer data used by the compute instructions; and scheduling the memory access instructions comprises, for each block of MLA instructions: scheduling the corresponding memory access instructions that retrieve data used by the set of MLA instructions in the block.

10. The computer-implemented method of claim 1 wherein the computer program does not expressly include the schedule for executing the MLA instructions and memory access instructions.

11. The computer-implemented method of claim 1 wherein statically scheduling the MLA instructions is based on a known duration for execution of the MLA instructions; and is further based on a known topology of data transfer paths between different DHUs, and further comprises scheduling the MLA instructions in a manner that avoids collisions and a need for arbitrations for the data transfer paths.

12. The computer-implemented method of claim 1 wherein statically scheduling the MLA instructions comprises:

determining a duration for execution of the MLA instructions, wherein the duration is independent of any run-time conditions; and statically scheduling the MLA instructions based on the determined durations.

13. A system for from implementing a machine learning network, the system comprising:

off-chip memory; and a machine learning accelerator (MLA) comprising a mesh of interconnected data handling units (DHUs) implemented on a semiconductor die; the DHUs executing (a) statically scheduled MLA instructions for implementing the machine learning network, wherein the MLA instructions are statically scheduled by a compiler prior to run-time and are executed with no run-time conditions, branching or dependencies, and (b) memory access instructions for retrieving data from the off-chip memory for use by the MLA instructions;

wherein the DHUs share access to the off-chip memory, but the memory access instructions are executed according to a schedule without a need for run-time contention resolution among the DHUs for access to the off-chip memory.

14. The system of claim 13 wherein the off-chip memory is dynamic random access memory (DRAM), and the DHUs contain static random access memory (SRAM).

15. The system of claim 14 further comprising a direct memory access (DMA) controller, wherein the DHUs have direct memory access to the DRAM.

16. The system of claim 13 wherein the system is configured to execute the MLA instructions without circuitry for confirming availability of the data retrieved from off-chip memory.

17. The system of claim 13 wherein the system is configured to execute the memory access instructions without circuitry for run-time contention resolution, arbitration or congestion avoidance for access to the off-chip memory.

18. The system of claim 13 wherein the DHUs comprise processing elements (PEs) and storage elements (SEs); and the MLA instructions comprise (a) compute instructions for execution by the PEs for executing computations in the machine learning network and (b) data transfer instructions for execution by the PEs and/or SEs for data transfer between PEs and/or SEs; and the memory access instructions are for execution by SEs.

* * * * *